United States Patent Office 2,839,475
Patented June 17, 1958

2,839,475
PRODUCTION OF SILICA-CONTAINING CATALYSTS OF HIGH PORE DIAMETER

William B. Innes, Stamford, Conn., assignor to American Cyanamid Company, New York, N. Y., a corporation of Maine No Drawing. Application April 8, 1955
Serial No. 500,271

5 Claims. (Cl. 252—451)

This invention relates to silica gel-type catalysts of high pore diameter and high pore volume content, and is directed particularly to catalysts suitable for use in the catalytic cracking of petroleum hydrocarbons. The invention includes certain novel catalysts of this type, characterized by an unusually high pore diameter and high pore volume accompanied by a high degree of attrition resistance, and also to improved methods for producing such high pore diameter catalysts.

Silica-containing catalysts are at present in wide commercial use for a variety of vapor-phase reactions wherein the fluidized catalyst technique is used. In carrying out reactions of this type a stream of reaction gases is passed upwardly through a reaction space containing the fluidized catalyst in finely divided form. The catalyst particles are in constant motion in the gas stream and are therefore subject to constant loss by attrition as the particles collide and rub over each other; attrition resistance is therefore a very important characteristic in catalysts of this type.

In the catalytic vapor-phase cracking of petroleum fractions, which is the largest industrial process using fluidized catalyst techniques, it has been recognized for some time that silica gel catalysts having a relatively large pore diameter would be useful in cracking certain heavy stocks, notably those of predominantly cyclic type, and this has led to the use of regenerated or equilibrium silica-alumina catalysts in cracking such heavy hydrocarbons. The activity of catalysts which have been repeatedly regenerated by burning out carbonaceous impurities is, however, much less than that of the same catalysts when freshly prepared, and therefore there is a definite need in the industry for silica-alumina and silica-magnesia catalysts of high pore diameter and pore volume content in a freshly prepared and highly active condition.

It is a principal object of the present invention to provide methods for the production of silica gel catalysts which combine a high degree of attrition resistance with a highly average pore diameter and high pore volume. A further object is the provision of novel catalysts of this type characterized in their freshly prepared condition by an average pore diameter of 100 A. and higher, a high pore volume of at least 0.9 cc. per gram, a low rate of activity decline when subjected to steam at high temperatures, a substantially improved carbon burning rate, and low attrition loss.

It has been found that silica gel catalysts which combine good resistance to attrition losses with high pore diameter and high pore volume content are obtained when the silica gel is prepared by acidifying an aqueous alkali metal silicate solution at temperatures substantially higher than those usually employed. This is an unexpected discovery, for it is generally considered that the heating of pre-formed gels and gel slurries causes a material reduction in toughness. The present invention in its broadest aspects, therefore, consists essentially in the production of silica gels by acidification of aqueous alkali metal silicate solutions at temperatures of at least 60° C., and preferably within the range of about 60°–90° C., followed by impregnating the resulting gel with hydrated aluminum oxide, magnesium oxide or other activating metal oxide in the quantities desired in the finished catalyst as hereinafter described. The resulting gel may be washed with water to remove alkali metal salts, or it may be immediately dried and hardened followed by leaching with water or dilute mineral acids to remove sodium compounds.

Acidification of the aqueous alkali metal silicate solution may be carried out either by adding this solution to a dilute mineral acid such as sulfuric, hydrochloric or nitric acid in quantities sufficient to produce a final pH in the range of about 1–4.5 or lower, or the mineral acid may be added to the alkali metal silicate solution. The first procedure, which results in the formation of a hydrogel that sets to a hydrated silica gel, is most commonly used in preparing silica-alumina catalysts having a relatively high alumina content, such as those containing 15%–30% of $Al_2O_3$, and is described for example in U. S. Patent No. 2,469,314. The second procedure, which results directly in the formation of a silica gel slurry, is most frequently used for the production of catalysts of lower alumina content, and is described in U. S. Patent No. 2,478,519. Either of these procedures may be used in practicing the present invention, both yielding catalysts of high pore diameter and pore volume when the silica gel formation is carried out at temperatures of 60° C. and higher.

When silica gel slurries are prepared by adding acid to an aqueous alkali metal silicate solution so that the hydrated silica formation takes place under alkaline conditions the concentrations of the reagents should preferably be adjusted to obtain a silica content of about 4–6% in the slurry. When a hydrogel is formed by adding the silicate solution to the acid higher solids contents are usually employed, since the object is to obtain a hydrogel that will set to a hydrated silica gel in a short time; in such reactions the silica content is usually substantially higher than 6% and may be as high as 10–15%. In both cases, however, the silica is impregnated with an activating metal oxide such as aluminum oxide or magnesium oxide in quantities sufficient to produce a finished catalyst of the desired composition. In impregnating with aluminum oxide a water-soluble aluminum compound such as aluminum sulfate or sodium aluminate is added to an aqueous slurry of the silica gel and precipitated on the silica by the addition of ammonia or of sulfuric acid, respectively. Impregnation of the silica with magnesia is usually carried out simply by adding to the silica slurry a suspension of magnesium hydroxide in water in quantity sufficient to produce a final catalyst composition containing about 15–20% to about 40% of magnesia, the balance being substantially all silica.

After incorporating the activating metal oxide the resulting plural gel may be dewatered and dried by contact with hot gases having a temperature within the range of about 600–1200° F., as in a spray drier or in a rotating drying kiln. The dried catalyst is then leached with water or dilute sulfuric or hydrochloric acid to remove sodium compounds and obtain a final catalyst composition having an $Na_2O$ content below about 0.05%. Alternatively, the alkali metal compounds may be removed from the wet gel by repeated filtration and washing, after which the purified gel is drum dried or spray dried by contact with hot gases.

Application of the principles of the invention, as above described, has resulted in the production of a novel class of catalysts having a number of important advantages in the catalytic cracking of petroleum hydrocarbons. These new catalysts are characterized by having an unusually large average pore diameter, both in their freshly prepared condition and after repeated regenerations. They also possess a high pore volume which, in freshly prepared catalysts, is at least 0.9 cc. per gram and in most silica-alumina catalysts is greater than 1.0 cc. per gram, and this pore volume decreases only very slightly, to a minimum of about 0.8 cc. per gram, upon repeated regenerations. They exhibit carbon burning rates which are about 10% to 15% higher than present commercial catalysts of the same type, and are therefore much more easily and quickly regenerated for reuse. Furthermore, they exhibit a much lower rate of activity decline upon steaming than is noted with comparable catalysts prepared at lower precipitation temperatures. Finally, despite the high temperatures at which the silica gel is formed, they exhibit attrition losses which are as low or lower than those of commercial catalysts of comparable composition. The new catalysts of the invention have an average pore diameter of at least 100 A. when freshly prepared, and in silica-alumina catalysts this figure increases to a value within the range of about 175–300 A. when equilibrium surface area is reached as the result of continued use and regeneration; this compares very favorably with the corresponding values of about 40–60 A. for freshly prepared catalysts and 125–150 A. for equilibrium catalysts of the type now in commercial use.

The invention will be further described and illustrated by the following specific examples. It should be understood, however, that although these examples may describe certain preferred compositions and operating conditions of the invention, they are given primarily for purposes of illustration and the invention in its broader aspects is not limited thereto.

*Example 1*

A laboratory strike tank equipped with a high speed stirrer was charged with 15 lbs. of commercial sodium silicate solution containing 28% of $SiO_2$ diluted with 62 lbs. of deionized water, the solution temperature being 65° C. Agitation was started and a stream of 25% sulfuric acid was run in during 34 minutes while maintaining the temperature at 65° C. The total quantity of dilute acid added was 8.65 lbs., the final pH was 3.2–3.3 and the $SiO_2$ content of the resulting wet gel slurry was about 5.4%.

Sufficient 14% ammonium hydroxide solution (170 cc.) was added to raise the pH to 7.5 and the silica slurry was aged for 2 hours with slow agitation; at the end of this time the temperature had dropped to 120° F. The batch was then impregnated with alumina by adding 2.2 lbs. of sodium aluminate during 5 minutes followed by neutralization with sulfuric acid to a pH of 4.0. The resulting hydrated silica-alumina gel was freed from sodium salts by filtering and washing four times on laboratory crock filters using deionized wash water having a temperature of about 20° C.

The wet cake from the last filtration was slurried in water to 7.5% solids and converted into a microspheroidal product by spray drying with hot gases having an inlet temperature of about 600°–750° F. The final product consisted predominantly of spheroidal catalyst particles in the range of from +40 microns to 200 mesh containing 12% by weight of alumina and 88% of silica on the moisture-free basis.

*Example 2*

The strike tank of Example 1 was charged with 15.7 lbs. of 28.2% $SiO_2$, 9% $Na_2O$ sodium silicate and 58 lbs. of deionized water, the solution having a temperature of 65° C., and 25% sulfuric acid was introduced with agitation at a rate of about 0.33 lb. per minute. Gel formation began after 20 minutes at a pH of 9.45 and temperature of 60° C. Acid addition was continued for an additional 15 minutes, when the pH was 3.14, after which sufficient ammonium hydroxide was introduced to raise the pH to 7.48. The batch was then aged for 2 hours with slow (40 R. P. M.) agitation.

A solution of 5.6 lbs. of $Al_2(SO_4)_3 \cdot 9H_2O$ in 7.9 lbs. of water was prepared and added to the aged silica gel slurry. After thorough mixing alumina was precipitated by adding 5.35 lbs. of 14% ammonium hydroxide which brought the pH to 4.1. The batch was then filtered and washed three times with water at 46° C. to remove sodium compounds, reslurried in water and spray dried. The finished catalyst contained, on a moisture-free basis, 18% of alumina, 0.01% of sodium as $Na_2O$ and 2.5% of combined sulfate, the balance being substantially all silica. Loss on ignition was 20%.

*Example 3*

Another batch of silica gel slurry was prepared at 65° C. using the quantities and procedures described in Example 2 and aged 2 hours at a pH of 7.6. A small amount of aluminum sulfate was then added and precipitated with ammonium hydroxide to serve as a flocculating agent and the gel slurry was filtered and the filter cake washed three times with deionized water acidified with sulfuric acid to a pH of 4.0. This procedure was repeated twice more using neutral wash water. The silica was then mixed with a slurry containing 1.5 lbs. of magnesium oxide and the mixture was heated to 140° F., aged 1 hour and spray dried. The final product contained 3% by weight of $Al_2O_3$ and 0.05% of $Na_2O$ on the dry basis and had a loss on ignition of 12.5%.

*Example 4*

A gelatinous silica slurry was prepared from 15.7 lbs. of 28.2% ($SiO_2$) sodium silicate and 58 lbs. of deionized water in the strike tank of Example 1 while maintaining the temperature at 60° C. 8.55 lbs. of 25% sulfuric acid was added during 20 minutes with agitation to a final pH of 3.0 after which the pH was raised to 8.05 by adding ammonia and the batch was aged for 1 hour and 45 minutes. A solution of 5.6 lbs. of $Al_2(SO_4)_3 \cdot 9H_2O$ in 7.9 lbs of water was added followed by sufficient ammonium hydroxide to bring the final pH to 4.0 and the gel was filtered and washed three times with deionized water at 20° C. to remove sodium compounds. It was then reslurried in water and spray dried. The finished catalyst contained 18% by weight of $Al_2O_3$ and 82% of silica on the dry basis; loss on ignition was 14.4%.

*Example 5*

The strike tank was charged with 15.7 lbs. of 28.2% ($SiO_2$) sodium silicate in 58 lbs. of deionized water, this solution having a temperature of 71° C. Sulfuric acid was introduced with agitation as in previous examples, a total of 7.35 lbs. of 25% acid being added during 25 minutes and the temperature of the batch remaining at 69–71° C. Sufficient ammonium hydroxide was then added to bring the pH to 8.0. The batch was aged 30 minutes before coating the gel with hydrated alumina.

After aging, a solution of 5.6 lbs. of $Al_2(SO_4)_3 \cdot 9H_2O$ in 7.9 lbs. of water was added followed by 4.7 lbs. of ammonia which brought the pH to 4.1 and completed the formation of aluminum hydroxide in the gel. The slurry was filtered on a laboratory crock filter and washed four times with deionized water at 43° C. The filter cake was reslurried in water and its pH adjusted to 7.0 by adding ammonium hydroxide and it was again filtered and washed. The cake was again suspended in water and filtered after adding sufficient ammonium hydroxide to bring its pH to 7.2 and the filter cake was again washed with water. The purified catalyst gel was then suspended in water and spray dried. The final product analyzed 18% $Al_2O_3$; 0.017% $Na_2O$ and 1.8% combined sulfate on a moisture-free basis; loss on ignition was 17.4%.

*Example 6*

The catalysts of Examples 1–4 were examined for pore volume, surface area and average pore wall separation and attrition resistance. Samples were then maintained in an atmosphere of steam at 1250° F. for 2 hours and 20 hours and surface area measurements were made.

The results are shown in the following table, which also contains data from a standard commercial 12% alumina catalyst made from gelatinous silica precipitated at about 40° C. by the procedure described in U. S. Patent No. 2,478,519 and from a commercial 25% alumina catalyst prepared as described in U. S. Patent No. 2,469,314.

The surface area determinations were made by the method of Brunauer, Emmett and Teller, J. A. C. S. 60, 309 (1938) as modified by Innes, Anal. Chem. 23, 759 (1951). Pore volumes were determined from the total liquid nitrogen absorption at near saturation pressure. Pore diameters were calculated by the formula $$PD = 4V/S \times 10^4$$

The figures for pore wall separation are explained in a paper entitled "Use of a Parallel Plate Model in Calculation of Pore Size Distribution," by W. B. Innes, published in Analytical Chemistry, vol. 29, pages 1069–1073, July 1957. Attrition resistance was determined by passing air through samples of the catalyst continuously by means of three 1/64-inch orifices for 45 hours and determining the quantity of fines (less than about 16 microns) produced.

The table follows:

capable of hardening to a dried gel of high pore volume by acidifying an aqueous solution of commercial alkali metal silicate at a temperature between about 60° and 90° C. during a time of about 20–35 minutes, impregnating the resulting gel with an activating metal oxide, and drying and hardening the resulting activated gel.

3. A method of producing silica gel catalysts of high pore diameter and high pore volume having good attrition resistance which comprises forming a hydrated silica gel capable of hardening to a dried gel having an average pore volume of at least 0.9 cubic centimeter per gram by reacting an aqueous solution of commercial alkali metal silicate with an acidifying coagulant at a temperature of 60°–90° C., impregnating the hydrated silica gel so formed with an activating metal oxide, and drying and hardening the resulting activated gel.

4. A method of producing silica-alumina gel catalysts of high pore diameter and high pore volume having good attrition resistance which comprises forming a hydrated silica gel capable of hardening to a dried gel having an average pore volume of at least 0.9 cubic centimeter per gram by reacting an aqueous solution of commercial sodium silicate with an acidifying coagulant at a temperature of 60°–90° C. during a time of about 20 to 35 minutes, impregnating the hydrated silica gel so formed with about 10% to 30% of hydrated aluminum oxide on the weight of the finished catalyst, and drying and

| Example No. | Strike Temp., °C. | Pore Vol., cc./g. | Pore Diameter, A. | Pore Wall Sepn., A. | Surface Area, Sq. Meters/Gram | | | | Attrition Loss, Percent |
|---|---|---|---|---|---|---|---|---|---|
| | | | | | As Made (a) | Steamed 2 Hrs. | Steamed 20 Hrs (b) | Decline (a-b) | |
| 1 | 65 | 1.02 | 100 | 88 | 409 | 312 | 251 | 158 | 16 |
| 2 | 65 | 1.11 | 130 | 108 | 338 | 287 | 243 | 95 | 16 |
| 3 | 65 | 0.90 | 83 | 74 | 435 | 328 | 246 | 189 | 18 |
| 4 | 60 | 1.11 | 100 | 90 | 442 | 355 | 284 | 158 | 11 |
| 5 | 71 | 1.16 | 106 | 133 | 436 | 317 | 264 | 172 | 13 |
| Commercial Catalysts: | | | | | | | | | |
| 12% Alumina | 36 | 0.70 | 48 | 40 | 580 | 337 | 228 | 352 | 16 |
| 25% Alumina | 43 | 0.82 | 58 | 57 | 560 | 345 | 256 | 304 | 20 |

What I claim is:

1. A plural gel spray dried microspheriodal cracking catalyst composed of about 70–90% by weight of silica and 10–30% of alumina on a dry basis and characterized in its freshly prepared condition by an average pore diameter of at least 100 Angstroms, an average pore volume of at least 0.9 cubic centimeter per gram, a low rate of activity decline when heated with steam at 1250° F. and good attrition resistance.

2. A method of producing silica gel catalysts of high pore diameter and high pore volume having good attrition resistance which comprises forming a hydrated silica gel hardening the resulting silica-alumina gel.

5. A method according to claim 4 in which the concentration of the aqueous solution of commercial sodium silicate is such that the hydrated silica gel is formed as a slurry having a silica content of about 4–6%.

References Cited in the file of this patent

UNITED STATES PATENTS

| | | |
|---|---|---|
| 2,395,524 | Weiser et al. | Feb. 26, 1946 |
| 2,698,305 | Plank et al. | Dec. 28, 1954 |
| 2,701,793 | Ashley | Feb. 8, 1955 |